(12) United States Patent
Denisart et al.

(10) Patent No.: US 8,512,784 B2
(45) Date of Patent: Aug. 20, 2013

(54) METHOD AND DEVICE FOR CONTROLLED BEVERAGE PRODUCTION USING CENTRIFUGAL FORCES

(75) Inventors: Jean-Paul Denisart, La Conversion (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 373 days.

(21) Appl. No.: 13/061,567

(22) PCT Filed: Aug. 20, 2009

(86) PCT No.: PCT/EP2009/060771
§ 371 (c)(1),
(2), (4) Date: Mar. 1, 2011

(87) PCT Pub. No.: WO2010/026053
PCT Pub. Date: Mar. 11, 2010

(65) Prior Publication Data
US 2011/0189362 A1 Aug. 4, 2011

(30) Foreign Application Priority Data

Sep. 2, 2008 (EP) .................................... 08163530
Oct. 27, 2008 (EP) .................................... 08167584

(51) Int. Cl.
*A47J 31/40* (2006.01)
*A23F 5/26* (2006.01)
(52) U.S. Cl.
USPC ................. 426/433; 99/283; 99/298; 99/300
(58) Field of Classification Search
USPC ............................ 426/433; 99/298, 300, 283
See application file for complete search history.

(56) References Cited

U.S. PATENT DOCUMENTS

| | | | |
|---|---|---|---|
| 239,659 A | 4/1881 | Houston | |
| 1,963,426 A | 6/1934 | Taylor | 97/233 |
| 1,963,476 A | 6/1934 | Smith | 210/67 |
| 2,778,739 A | 1/1957 | Rodth | 99/171 |
| 3,025,781 A | 3/1962 | Bossi | |
| 3,233,535 A | 2/1966 | Fowlie | |
| 3,566,770 A | 3/1971 | Crossley | 99/289 |
| 3,654,852 A | 4/1972 | Rosan, Sr. | |

(Continued)

FOREIGN PATENT DOCUMENTS

| | | |
|---|---|---|
| AT | 197553 B | 5/1958 |
| BE | 894 031 A1 | 2/1983 |

(Continued)

OTHER PUBLICATIONS

Restriction Requirement U.S. Appl. No. 13/133,613 dated Mar. 28, 2013.

(Continued)

*Primary Examiner* — Anthony Weier
(74) *Attorney, Agent, or Firm* — Winston & Strawn LLP (57) ABSTRACT

The present invention relates to a beverage production device for preparing a liquid comestible from a portioned food substance contained in a sealed capsule. The device includes a centrifugal unit for receiving the sealed capsule, a driving mechanism connected to the centrifugal unit for enabling a rotational motion of the centrifugal unit, a liquid supply connected to the centrifugal unit, a flow rate or pressure measuring mechanism for the supplied liquid and a controller for controlling the rotational speed of the driving mechanism dependent on the measured flow rate or the measured pressure of the liquid.

19 Claims, 5 Drawing Sheets

(56) References Cited

U.S. PATENT DOCUMENTS

| | | | |
|---|---|---|---|
| 3,812,773 A | 5/1974 | Hultsch | 99/290 |
| 3,822,013 A | 7/1974 | Van Der Veken | 206/233 |
| 3,967,546 A | 7/1976 | Cailliot | 99/286 |
| 3,985,069 A | 10/1976 | Cavalluzzi | 99/295 |
| 4,426,919 A | 1/1984 | Rhoten | 99/289 |
| 4,464,982 A | 8/1984 | Leuschner et al. | 99/287 |
| 4,473,002 A | 9/1984 | Leuschner et al. | 99/302 |
| 4,545,296 A | 10/1985 | Ben-Shmuel | 99/289 |
| 4,584,101 A | 4/1986 | Kataoka | 201/474 |
| 4,806,375 A | 2/1989 | Favre | 426/433 |
| 4,846,052 A | 7/1989 | Favre et al. | |
| 4,859,337 A | 8/1989 | Woltermann | 210/474 |
| 4,962,693 A | 10/1990 | Miwa et al. | 99/283 |
| 5,047,252 A | 9/1991 | Liu et al. | 426/79 |
| 5,265,517 A | 11/1993 | Gilbert | 99/280 |
| 5,300,308 A | 4/1994 | Louridas | 426/112 |
| 5,325,765 A | 7/1994 | Sylvan et al. | 99/295 |
| 5,566,605 A | 10/1996 | Lebrun et al. | 99/302 |
| 5,637,335 A | 6/1997 | Fond et al. | 426/84 |
| 5,649,472 A | 7/1997 | Fond et al. | 99/295 |
| 5,755,149 A | 5/1998 | Blanc et al. | 99/289 |
| 5,773,067 A | 6/1998 | Freychet et al. | 426/506 |
| 5,948,455 A | 9/1999 | Schaeffer et al. | 426/77 |
| 6,007,853 A | 12/1999 | Lesser | 426/77 |
| 6,607,762 B2 | 8/2003 | Lazaris et al. | 426/79 |
| 6,777,007 B2 | 8/2004 | Cai | 426/78 |
| 6,786,134 B2 | 9/2004 | Green | 99/289 P |
| 7,017,775 B2 | 3/2006 | Zettle et al. | 220/781 |
| 7,216,582 B2 | 5/2007 | Yoakim et al. | 99/295 |
| 7,469,627 B2 | 12/2008 | Li | 99/286 |
| 7,770,512 B2 | 8/2010 | Albrecht | 99/295 |
| 8,151,694 B2 | 4/2012 | Jacobs et al. | 99/302 R |
| 8,327,754 B2 * | 12/2012 | Kirschner et al. | 99/295 |
| 8,409,646 B2 | 4/2013 | Yoakim et al. | |
| 2003/0145736 A1 | 8/2003 | Green | 99/280 |
| 2004/0255790 A1 * | 12/2004 | Green | 99/279 |
| 2005/0150390 A1 | 7/2005 | Schifferle | 99/295 |
| 2005/0188854 A1 * | 9/2005 | Green et al. | 99/275 |
| 2006/0110507 A1 | 5/2006 | Yoakim et al. | 426/433 |
| 2006/0236871 A1 | 10/2006 | Ternite et al. | 99/295 |
| 2007/0079708 A1 | 4/2007 | Li | 99/279 |
| 2007/0248734 A1 | 10/2007 | Denisart et al. | |
| 2008/0038414 A1 | 2/2008 | Veciana I Membrado et al. | |
| 2009/0032454 A1 | 2/2009 | Rapparini | 210/337 |
| 2009/0136639 A1 | 5/2009 | Doglioni Majer | 426/431 |
| 2009/0155422 A1 | 6/2009 | Ozanne | 426/89 |
| 2010/0024658 A1 | 2/2010 | Jacobs et al. | |
| 2010/0064899 A1 | 3/2010 | Aardenburg | 99/295 |
| 2010/0173056 A1 | 7/2010 | Yoakim et al. | 426/433 |
| 2010/0176004 A1 | 7/2010 | Schneider et al. | 205/687 |
| 2010/0178392 A1 | 7/2010 | Yoakim et al. | 426/80 |
| 2010/0178404 A1 | 7/2010 | Yoakim et al. | 426/431 |
| 2010/0186599 A1 | 7/2010 | Yoakim et al. | 99/295 |
| 2010/0203198 A1 | 8/2010 | Yoakim et al. | 426/80 |
| 2010/0203208 A1 | 8/2010 | Yoakim et al. | 426/431 |
| 2010/0239734 A1 | 9/2010 | Yoakim et al. | 426/433 |
| 2011/0041702 A1 | 2/2011 | Yoakim et al. | 99/302 R |
| 2011/0052761 A1 | 3/2011 | Yoakim et al. | 426/77 |
| 2011/0217421 A1 | 9/2011 | Perentes et al. | 426/80 |
| 2011/0244099 A1 | 10/2011 | Perentes et al. | 426/431 |
| 2012/0058226 A1 | 3/2012 | Winkler et al. | |

FOREIGN PATENT DOCUMENTS

| | | |
|---|---|---|
| DE | 2151920 A1 | 4/1973 |
| DE | 32 41 606 A1 | 3/1984 |
| DE | 35 29 053 A1 | 2/1987 |
| DE | 35 29 204 A1 | 2/1987 |
| DE | 37 19 962 C1 | 6/1988 |
| DE | 42 40 429 A1 | 6/1994 |
| DE | 44 39 252 A1 | 5/1996 |
| DE | 10355671 A1 | 6/2004 |
| DE | 10 2005 007 852 A1 | 8/2006 |
| EP | 0242556 A1 | 10/1987 |
| EP | 0 250 810 A1 | 1/1988 |
| EP | 0 367 600 A1 | 5/1990 |
| EP | 0 512 470 A1 | 11/1992 |
| EP | 0521187 A1 | 1/1993 |
| EP | 0 607 759 A1 | 7/1994 |
| EP | 0 651 963 A1 | 5/1995 |
| EP | 0 749 713 A1 | 12/1996 |
| EP | 0 806 373 A1 | 11/1997 |
| EP | 1 208 782 A1 | 5/2002 |
| EP | 1 299 022 B1 | 4/2003 |
| EP | 1 654 966 A1 | 5/2006 |
| EP | 1 774 878 A1 | 4/2007 |
| EP | 1 813 333 A2 | 8/2007 |
| EP | 2 000 062 A1 | 12/2008 |
| EP | 2155021 B1 | 3/2011 |
| FR | 2 132 310 A1 | 11/1972 |
| FR | 2 487 661 A1 | 2/1982 |
| FR | 2 513 106 A1 | 3/1983 |
| FR | 2 531 849 A1 | 2/1984 |
| FR | 2 535 597 A1 | 5/1984 |
| FR | 2 624 364 A1 | 6/1989 |
| FR | 2 685 186 A1 | 6/1993 |
| FR | 2 686 007 A1 | 7/1993 |
| FR | 2 726 988 A1 | 5/1996 |
| GB | 1 506 074 A | 4/1978 |
| GB | 2 227 405 A | 8/1990 |
| GB | 2 253 336 A | 9/1992 |
| GB | 2 416 480 A | 2/2006 |
| JP | 50016225 A | 2/1975 |
| JP | 59082817 A | 5/1984 |
| JP | 62254719 A | 11/1987 |
| JP | 63034581 U | 3/1988 |
| JP | 02124111 A2 | 5/1990 |
| JP | 02189114 A2 | 7/1990 |
| JP | 06339431 A2 | 12/1994 |
| JP | 3034606 | 2/1997 |
| JP | 2001061663 A2 | 3/2001 |
| JP | 2002189115 A | 7/2002 |
| JP | 2002215414 A | 8/2002 |
| JP | 2003144973 A2 | 5/2003 |
| JP | 2004517654 A | 6/2004 |
| JP | 2005516602 | 6/2005 |
| JP | 2005199071 A2 | 7/2005 |
| JP | 2005525146 A | 8/2005 |
| JP | 2006515764 A | 6/2006 |
| JP | 2006518226 A | 8/2006 |
| WO | WO 94/02059 A1 | 2/1994 |
| WO | WO 02/35977 A1 | 5/2002 |
| WO | WO2004/030500 A1 | 4/2004 |
| WO | WO2005/066040 A2 | 7/2005 |
| WO | WO 2006/082064 | 8/2006 |
| WO | WO 2006/112691 A1 | 10/2006 |
| WO | WO2007/014584 A1 | 2/2007 |
| WO | WO 2007/041954 A1 | 4/2007 |
| WO | WO2007042414 A1 | 4/2007 |
| WO | WO 2007/085921 A2 | 8/2007 |
| WO | WO 2007/110768 A2 | 10/2007 |
| WO | WO 2008/087099 A2 | 7/2008 |
| WO | WO 2008/148601 A1 | 12/2008 |
| WO | WO 2008/148604 A1 | 12/2008 |
| WO | WO 2008/148646 A1 | 12/2008 |
| WO | WO 2008/148650 A1 | 12/2008 |
| WO | WO 2008/148656 A1 | 12/2008 |
| WO | WO 2008/148834 A1 | 12/2008 |
| WO | WO 2009/050540 A1 | 4/2009 |
| WO | WO 2009/106175 A1 | 9/2009 |
| WO | WO 2009/106598 A1 | 9/2009 |
| WO | WO 2009/133134 A1 | 11/2009 |
| WO | WO 2010/026045 A1 | 3/2010 |
| WO | WO 2010/038213 A2 | 4/2010 |
| WO | WO 2010/041179 A2 | 4/2010 |

OTHER PUBLICATIONS

Restriction Requirement U.S. Appl. No. 12/856,369 dated Feb. 15, 2013.
Notice of Allowance U.S. Appl. No. 12/776,155 dated Mar. 1, 2013.
Notice of Allowance U.S. Appl. No. 12/602,758 dated Dec. 1, 2012.
Advisory Action, U.S. Appl. No. 12/602,730 dated Jan. 18, 2013.
International Search Report mailed Feb. 9, 2010, Application No. PCT/EP2009/060697 filed Aug. 19, 2009.

International Search Report mailed Feb. 8, 2010, Application No. PCT/EP2009/060771 filed Aug. 20, 2009.
International Search Report and Written Opinion mailed Sep. 11, 2008, Application No. PCT/EP2008/054401 filed Apr. 11, 2008.
International Search Report and Written Opinion mailed Oct. 24, 2008, Application No. PCT/EP2008/054810 filed Apr. 21, 2008.
International Search Report and Written Opinion mailed Oct. 8, 2008, Application No. PCT/EP2008/056310 filed May 22, 2008.
International Search Report and Written Opinion mailed Oct. 1, 2008, Application No. PCT/EP2008/056345 filed May 23, 2008.
International Search Report and Written Opinion mailed Sep. 11, 2008, Application No. PCT/EP2008/056412 filed May 26, 2008.
International Search Report and Written Opinion mailed Oct. 7, 2008, Application No. PCT/EP2008/056968 filed Jun. 5, 2008.
European Search Report dated Apr. 9, 2010, Application No. EP 09174573.
U.S. Appl. No. 12/602,542, filed Dec. 1, 2009.
U.S. Appl. No. 12/602,568, filed Dec. 1, 2009.
U.S. Appl. No. 12/602,562, filed Dec. 1, 2009.
U.S. Appl. No. 12/602,553, filed Dec. 1, 2009.
U.S. Appl. No. 12/602,577, filed Dec. 1, 2009.
U.S. Appl. No. 12/602,730, filed Dec. 2, 2009.
U.S. Appl. No. 12/776,155, filed May 7, 2010.
U.S. Appl. No. 12/856,369, filed Aug. 13, 2010.
U.S. Appl. No. 12/860,705, filed Aug. 20, 2010.
Non Final Office Action, U.S. Appl. No. 12/776,155, dated Jul. 18, 2012.
Final Office Action, U.S. Appl. No. 12/602,568, dated Jul. 16, 2012.
Final Office Action, U.S. Appl. No. 12/602,562, dated Jun. 22, 2012.
Final Office Action, U.S. Appl. No. 12/602,577, dated Jul. 20, 2012.
Final Office Action, U.S. Appl. No. 12/860,705, dated Jul. 18, 2012.
Non Final Office Action , U.S. Appl. No. 12/602,577, dated Mar. 20, 2012.
Non Final Office Action , U.S. Appl. No. 12/602,562, dated Feb. 13, 2012.
Final Office Action , U.S. Appl. No. 12/602,562, dated Jun. 22, 2012.
Non Final Office Action , U.S. Appl. No. 12/602,542, dated Apr. 13, 2012.
Non Final Office Action , U.S. Appl. No. 12/602,730, dated May 17, 2012.
Non Final Office Action , U.S. Appl. No. 12/860,705, dated Mar. 16, 2012.
Restriction Requirement , U.S. Appl. No. 12/602,553 dated May 11, 2012.
Non Final Office Action , U.S. Appl. No. 12/602,568, dated Mar. 20, 2012.
Green Mountain Coffee, New K-Cup Samplers Offer More Variety; Jul. 11, 2008, pp. 1-5. Accessed Mar. 6, 2012 from http://www.greenmountincafe.com/2008/07/new-k-cup-samplers-offer-more-variety/.
Non Final Office Action, U.S. Appl. No. 13/061,558, dated Dec. 6, 2012.
Final Office Action, U.S. Appl. No. 12/602,542, dated Oct. 4, 2012.
Final Office Action, U.S. Appl. No. 12/602,730, dated Sep. 18, 2012.
Non Final Office Action, U.S. Appl. No. 12/602,553, dated Aug. 23, 2012.
Non Final Office Action, U.S. Appl. No. 12/602,568, dated July Oct. 19, 2012.
U.S. Appl. No. 13/061,558, filed Mar. 1, 2011.
Chilean Patent Application No. CL-1652-2008, filed Jun. 5, 2008 (English in U.S. equivalent 2010/0173056 and WO2008/148601).
Chilean Patent Application No. CL-1653-2008, filed Jun. 5, 2008 (English in U.S. equivalent 2010/0186599 and WO2008/148604).
Chilean Patent Application No. CL-1655-2008, filed Jun. 5, 2008 (English in U.S. equivalent 2010/0178404 and WO2008/148646).

* cited by examiner

METHOD AND DEVICE FOR CONTROLLED BEVERAGE PRODUCTION USING CENTRIFUGAL FORCES

This application is a 371 filing of International Patent Application PCT/EP2009/060771 filed Aug. 20, 2009.

FIELD OF THE INVENTION

The present invention relates to a device and a capsule system for preparing a liquid comestible from a food substance contained in a receptacle by passing liquid through the food substance using centrifugal forces. In particular, the invention relates to a device and a method for controlling the flow rate of a liquid during the beverage preparation.

BACKGROUND OF THE INVENTION

It is known to prepare beverages by separating a mixture consisting of brewed coffee and coffee powder with centrifugal forces. Such a mixture is obtained by the interaction of hot water and coffee powder for a defined time. The water is then forced through a screen, on which screen powder material is present.

The existing centrifugal systems suffer the inconvenience that the strength of coffee cannot be regulated properly.

For instance, GB1506074 relates to a centrifugal device comprising a filter for filtering coffee. However, the contact time between coffee and hot water is not controllable. For example, the coffee granulometry can influence the residence time of liquid in the coffee and so the extraction quality.

On the other hand, solutions are known for increasing the pressure in the cell such as by a fixed or pressure-responsive restriction means.

It is known to increase the pressure in the centrifugal cell by increasing the rotational speed such as in EP651963. In this document, the pressure increase is obtained by a rubber-elastic element interposed at the interface between the lid and the cup of the centrifugal cell. Such an element deforms elastically to leave a filtering passage for the liquid when a certain pressure is attained at the interface.

FR2487661, U.S. Pat. No. 4,545,296 and WO2006/112691 relate to centrifugal systems wherein a fixed restriction is placed downstream of the filter to increase the pressure. However, in these systems, the contact time of the coffee and water is not truly controlled. As in EP651963, the taste of the coffee can be modified by changing the speed consequently the pressure in the cell.

GB2227405 discloses an apparatus for preparing a coffee infusion wherein the speed and/or duration of rotation is set to give a predetermined strength of infusion.

WO2007/041954 relates to a coffee maker with combined milling stage and brewing stage. Different approaches can be used to control the flavours of the brewed coffee. A first approach is to control the grain size of coffee powder during milling stage. A second approach is to control the speed of water penetration through the milled coffee powder. Therefore, different rotational speeds of the brewing basket are set up by the controller. A disadvantage is that depending on the flow characteristics in the ground coffee taking into account the powder characteristics, coffee compaction, water quality, temperatures, etc., the strength and other quality attributes (e.g., crema) of the coffee can fluctuate a lot.

In PCT/EP08/056310, a solution is proposed into which a flow restriction is placed in or outside the centrifugal cell, e.g., a capsule containing coffee powder. The flow restriction can comprise a regulating valve offering a back-pressure. The valve opens under the effect of pressure in the cell. The valve can be preloaded by a resilient element (rubber or spring). A control unit can be provided in the device for setting the rotational speed according to the nature of the liquid to be brewed and/or the substance of the capsule.

Based on the prior art, the present invention aims at providing a device and a method for allowing an efficient control of the strength of a liquid comestible such as a coffee or tea beverage in a centrifugal beverage production device which takes into account the flow attributes through the ingredients.

The present invention also aims at providing a device and a method for allowing the production of different levels of foam or "crema" of the liquid comestible, in particular for coffee beverages.

In particular, one aspect of the invention, is to ensure that the key quality attributes of the beverage can be controlled properly. In particular, one aspect of the invention is to ensure that the strength or concentration of the beverage is reproducible, i.e., that this characteristic does not fluctuate much for a same desired beverage. Still an aspect of the invention is to ensure the key quality attributes (i.e., concentration, coffee crema level) as well as the volume of the beverage can be produced and selected in a controllable manner depending on the type of beverages desired.

SUMMARY OF THE INVENTION

In a first aspect, the present invention relates to a beverage production device for preparing a liquid comestible from a portioned food substance contained in a capsule or cell, comprising a centrifugal unit for receiving the capsule or cell, driving means connected to the centrifugal unit for enabling a rotational motion of the capsule or cell in the unit, liquid supply means being connected to the centrifugal unit to supply liquid in the capsule or cell, means for measuring the flow rate, or respectively the pressure, of the liquid, and a control unit for controlling the flow rate of liquid, or respectively the pressure of liquid, to match a flow rate reference, or respectively a pressure reference, in a control loop by automatically adjusting the rotational speed of the driving means during the extraction phase of the beverage production depending on the measured flow rate, or respectively the measured pressure, of the liquid.

With a device according to the present invention it is possible to enable a controlled interaction between a preferably portioned food substance provided in a capsule or cell and a liquid such as water. Thereby, the interaction is particularly enabled due to the centrifugal forces exerted on the capsule or cell during and after liquid has been provided thereto and, the substance:liquid interaction control is particularly obtained by monitoring and adjusting the flow rate of liquid that feeds the capsule or cell.

In a preferred embodiment, the capsule is removably insertable into the centrifugal unit of the device. The centrifugal unit of the device preferably comprises two enclosing members which are movably arranged relatively to each other and which are designed to enclose the capsule within the device.

One enclosing member is preferably equipped with a liquid injection assembly which enables the provision of liquid to the capsule enclosed within the centrifugal unit of the device. Preferably, the injection assembly is arranged centrically with respect to a rotational axis of the centrifugal unit. The injection assembly preferably comprises a tubular member for providing liquid to a central inlet port of the capsule. In a possible embodiment, the injection assembly comprises a piercing member designed to pierce the inlet port in a face of the capsule. The injection assembly is connected to the liquid supply means of the device.

A second enclosing member of the centrifugal unit is preferably a rotary drum which is of complementary shape to the capsule. Hence, a user may insert the capsule into said rotary drum which is held in the drum a stable manner.

The driving means for driving the centrifugal unit is preferably a motor such as an electric motor which is connected to the control means of the device. Thereby, the driving means are connected to the rotary drum by means of a motor axle which thus enables a rotational movement of the rotary drum and the capsule housed by the rotary drum.

The liquid supply means of the device comprise a reservoir for storing liquid. Preferably, the reservoir is a boiler which comprises heating means in order to heat the liquid therein. However, the liquid supply means may as well comprise a liquid reservoir and an in-line heating element such as a thermoblock or an instant heater placed downstream of the reservoir in the fluid circuit.

Moreover, the liquid supply means preferably comprise a pump for providing liquid from the reservoir to the injection assembly and thus, to the centrifugal unit of the device. The pump is preferably connected to the control means of the device.

The means for measuring the flow rate of the liquid are preferably arranged in the fluid circuit between the liquid supply means and the centrifugal unit of the device.

The control unit preferably comprises an event-triggered state machine connected to the driving means and the means for measuring the flow rate of the liquid provided to the centrifugal unit. Moreover, the control unit is preferably connected to a manual interface which can be operated by a user.

In particular, the flow rate reference can be a flow rate set point which is set as a constant during an extraction phase. The extraction phase is here defined as the main phase during which liquid is supplied by the supply means to the capsule and said liquid passes through the ingredients in the capsule and beverage liquid is thus dispensed from the capsule.

In a possible alternative, the flow rate reference represents a variable profile of flow rate, i.e., set points varying in function of time. Indeed, it might be advantageous in some case to vary the flow rate set point during the extraction phase in order to achieve particular extraction profiles. In this case, the control unit can store a variable profile of flow rate which corresponds to a particular selected beverage. However, for avoiding too much control complexity, preference is given to a constant flow rate set point for a same desired beverage.

In a preferred mode, the control unit is preferably configured for selecting or calculating different preset flow rates corresponding to respectively different beverage (e.g., coffee) strengths. The control unit is preferably connected to a user's interface for a selection of the different beverages by the user.

Therefore, the control unit enables the regulation of the flow rate (as a constant or variable profile) by adjusting the speed of the driving means during at least one essential phase of the beverage preparation in order to set the strength (i.e., the concentration) of the beverage to be prepared. Thereby, the strength can be selected by a user of the device by means of the manual interface.

Moreover, the control unit is configured for controlling the volume of the beverage by receiving data from the flow measuring means and controlling accordingly the volume of liquid supplied by the liquid supply means, in particular, the pump, to the capsule or cell.

However, it may as well be possible that the strength and/or volume are set by identification means arranged within the device which interact with the capsule provided to the device. Such identifications means may be a barcode scanner for example which reads a barcode provided on an outside face of the capsule and which enables a detection of the type of capsule and/or the nature of ingredients provided within the capsule in order to apply a predefined extraction profile for the beverage to be prepared.

During the beverage extraction phase of a beverage preparation cycle, the speed of the driving means is thus regulated in control loop to correct the flow rate at a substantially constant value or, eventually to follow a predefined flow rate profile. Hence, a preset nominal flow rate is obtained during the extraction phase of the beverage production. Since the flow rate is directly linked to the contact time of the liquid with the ingredient in the capsule, the strength of the beverage is thus essentially determined by maintaining the flow rate to said predefined set point or profile corresponding to the selected strength of the beverage.

During the extraction phase, a centrifugal cell which is placed within the centrifugal unit acts as a centrifugal pump by drawing liquid such as water from the liquid supply. Accordingly, the rotational speed of the motor driving the centrifugal unit in rotation compensates for the flow rate fluctuation to the set point. In particular, when the measured flow rate becomes lower than the set point, the rotational speed is increased by the control unit to raise the flow rate up to the set point and, inversely, when the measured flow rate becomes higher than the set point, the rotational speed is decreased by the control unit to lower the flow rate down to the set point. Obviously, the lowest possible fluctuations of flow rates to the set point are preferred.

The centrifugal cell according to the present invention may be a single-use capsule provided to the centrifugal unit. Furthermore, the centrifugal cell may as well be a refillable filter cell.

The single-use capsule to be used with the present invention can be closed before use in a gas impervious manner to maintain freshness of the food ingredients housed therein. The capsule preferably contains a protective atmosphere for the ingredients such as inert gas. The capsule can be closed by a membrane which is pierced or peeled off during the beverage preparation process. The capsule may comprise coding means such as a barcode for example which is read by the machine. Accordingly, corresponding parameters, such as for example the beverage strength, the beverage volume and/or the beverage crema or foam, can be adjusted by the control means.

In case a refillable filter cell is provided to the centrifugal cell, said filter cell is preferably removably arranged within the device. Furthermore, the filter cell is preferably designed to be accessible from the outside of the device. Therefore, removing and loading of food substance from or to the centrifugal cell is enabled.

The pump of the liquid supply means is set to supply a sufficient quantity of water during the beverage preparation cycle to the centrifugal cell whereas the rotational speed of the centrifugal cell actually regulates the flow rate of the dispensed liquid. The pump is preferably a low pressure pump such as a centrifugal pump or any other suitable low pressure pump.

The contact time between the food ingredients and hot water contained in the capsule varies in inverse proportion to the water flow rate which circulates in the liquid supply circuit and thus, through the centrifugal cell. In general, for obtaining a higher concentration or strength of the beverage to be prepared, the water flow rate can be set at a relatively low value, whereas for obtaining a lighter concentration or strength of the beverage, the water flow rate is set at a relatively higher value.

This is in particular advantageous for preparing a hot beverage such as coffee, tea, hot chocolate or the like with a desired concentration respectively a desired strength.

The flow rate is measured by flow rate sensing means which are placed in the liquid flow path of the device. Such flow metering means provide continuous indications to the control means which, in response, regulate the speed of the motor.

The flow rate sensing means is preferably a pulse-coded flow-metering turbine placed between the water supply, e.g., a water reservoir and the liquid injection assembly of the centrifugal cell. The turbine thus generates electrical impulses which period is proportional to the velocity of the flow. Accordingly, the control means are designed to calculate the flow rate based on the electrical impulses provided by the pulse coded flow-metering turbine.

Preferably, the control means are also configured to control the volume of the delivered beverage. Accordingly, the volume is set up by receiving information of the flow meter such as by counting the number of impulses generated by the flow meter or by measuring the period of the impulses.

The manual interface of the device preferably comprises a selection means for the user to select the strength of the beverage and preferably also the volume of the beverage. The user may thus select the concentration and/or volume of the beverage to be prepared. For example for a coffee beverage, different strength of coffees can be selected (e.g., light, medium, strong) and different volumes (e.g., 25, 40, 110, 250 mL) corresponding to different cup sizes. For example, for simplifying the selection of the user interface but still meeting the larger possible preference of the users, the choices can be made possible amongst a limited number of selectable combinations relative to coffee strengths and volumes, for example, under coffee selections which are explicit for the user (e.g., ristretto, espresso light/strong, lungo light/strong, Americano, etc.).

When different kinds of beverage are proposed such as coffee, tea, milk, etc., the selection means may also be used to select the kind of beverage to be prepared in such as coffee, tea, herbal tea, soup or hot chocolate for example. Thereby, the selections means may provide information about different liquid comestibles to be prepared for which different extraction profiles are stored.

In a possible embodiment relating to the preparation of a coffee beverage with the present device, the manual interface may be used for selecting a desired kind of coffee, such as a 'ristretto', an 'espresso', a 'lungo' or an 'Americano' which may express a particular combination of coffee strength and volume. Furthermore, the strength of coffee can eventually be further adjusted selectively for one or more of these kinds of coffees.

Moreover, the desired coffee strength is preferably chosen by selection means such as a potentiometer of the manual interface. Accordingly, the strength of a coffee beverage to be prepared can be varied by a continuous or incremental variation of the flow rate set point which has been set initially by the device. In a possible embodiment, the strength of coffee beverage can be set, for instance, after the selection of coffee volume is carried out.

Considering in particular, coffee preparation from ground coffee contained in the cell, i.e., a single-use capsule, the extraction profile set by the control means of the device preferably comprises at least a pre-wetting phase, an extraction phase and a dry-spinning phase which differ normally in at least the associated rotational speed of the driving means.

The pre-wetting phase of the extraction profile takes place at the beginning of the beverage preparation cycle. Thereby, liquid such as water is supplied to the centrifugal cell, i.e. the capsule, which is maintained static or is rotated at relatively low speed, preferably lower than 200 rpm, most preferably lower than 100 rpm. Accordingly, the pre-wetting phase enables a homogeneous wetting of the dry food ingredients, i.e., ground coffee, housed within the capsule. Hence, the compacting of dry ingredients and a resulting blockage during the beverage preparation cycle can be effectively prevented.

The amount of liquid provided to the centrifugal cell respectively to the capsule during the pre-wetting phase is preferably chosen such that the cell respectively the capsule is full of liquid and gas is essentially expelled out of the capsule. Accordingly, the food ingredients are completely flooded. During this phase, there is essentially no extracted liquid being dispensed from the capsule as the centrifugal pressure at low speed in the capsule remains too low to enable to overcome the pressure losses created in the capsule and the possible restriction means in the flow path (e.g., valve means).

After the pre-wetting phase, the extraction phase of the extraction profile takes place. It preferably comprises a ramp up of the driving means to the extraction speed level which is a higher rotational speed than during the pre-wetting phase. Preferably, a predefined extraction speed is set to avoid important fluctuation of the flow rate during the ramp-up phase. Once the predefined extraction speed is reached, the rotational speed of the driving means is controlled by the control means in order to provide a relatively constant flow rate of the liquid.

In order to control the contact time between food ingredients and water during the beverage preparation cycle, the value of the liquid flow rate is calculated by the detection of the period of the impulses generated by the flow meter.

Depending on the type of beverage to be delivered, during the extraction phase, the rotational speed can be comprised between 5,000 and 15,000 rpm, preferably 8,000 and 12,000 rpm. In particular, the speed can be influenced by the flow resistance in the capsule and by the restriction means.

After the extraction phase, the spin-drying phase of the extraction profile takes place. Thereby, the water pump of the liquid supply means is stopped by the control means in order to stop supply of water to the centrifugal cell. Moreover, a second ramp-up phase or acceleration of the rotational speed is carried out followed by a phase where the rotational speed is maintained at a relatively elevated constant value to perform spin-drying of the food ingredients in the centrifugal cell respectively within the capsule. The beverage preparation cycle can be ended up by a deceleration phase where the rotational speed is progressively lowered to the zero value.

Accordingly, any residual liquid present in the centrifugal cell or the capsule is eliminated and discharged via a spout of the device. The rotational speed of the spin-drying phase is set higher than the rotational speed controlled during the extraction phase.

Since the concentration of the residual liquid discharged by the centrifugal cell may have a different concentration than the liquid comestible discharged during the extraction phase, the residual liquid may be discharged by purging means which can be selectively connected to a spout of the device. Therefore, the concentration of the beverage to be prepared is not influenced by the residual liquid discharged during the spin-drying phase.

It should be understood that the spin-drying phase can be carried out for a predetermined time (e.g., a few seconds).

The extraction profile and particularly the rotational speed may vary for each kind of beverage to be prepared in order to influence the concentration or strength of the beverage. Accordingly, different extraction profiles may be chosen by means of the manual interface. The predefined extraction profiles are preferably stored in the control means or memory means connected thereto.

Furthermore, the centrifugal unit of the device preferably comprises flow restriction means at a delivery side of the centrifugal unit.

The flow restriction means at the delivery side of the centrifugal unit may comprise a pressure-responsive valve which opens under the pressure of the liquid coming out of the unit. Such a valve is for example described in PCT/EP08/056310.

In an embodiment, the restriction means is a fixed Venturi duct (eductor) formed of one or more small outlets. The restriction means can be provided at the delivery outlets of the capsule or downstream of the capsule.

The advantage is that a certain pressure is necessary before the liquid can exit the centrifugal unit and therefore, the contact time of liquid is promoted in the cell by creating a delayed release. Accordingly, an improved interaction between water and the substance contained in the capsule is obtained. For coffee, for example, it may be advantageous to optimize interaction of water and the ground coffee particles contained in the centrifugal cell to obtain a good extraction of the coffee and aroma compounds.

Moreover, the restriction such as the valve provides a relatively high pressure drop which promotes the generation of a nice amount of crema or foam of the beverage.

During the extraction phase, the food ingredients within the centrifugal cell are traversed by liquid provided by the liquid supply means. The beverage resulting from the interaction of liquid and food ingredients, which is discharged from the centrifugal cell due to the centrifugal forces acting thereon, forces the flow restriction valve to open when the pressure of liquid exceeds the preload of the valve. The beverage extract is thus discharged from the centrifugal cell via the spout with a relatively consistent flow.

In a preferred embodiment, the flow restriction valve can be formed by at least one engaging portion of the device which is adapted to move relatively to an engaged portion of the device or, alternatively, of an engaged portion of the capsule under the effect of the pressurized liquid exiting the capsule, for making a thin annular laminating passage for the liquid.

The preload of the flow restriction valve is preferably adjustable. Thus, the preload of the valve can be increased to force the rotational speed to increase for maintaining the same flow rate. Conversely, the preload can be decreased to lower the rotational speed for maintaining the same flow rate. Thereby, the adjustment of the preload of the valve can impact on the level of crema or foam of the beverage which can be created.

Thereby, it has been found that a higher rotational speed of the driving means during the extraction phase provides a higher amount of crema or foam of the beverage. This is particularly advantageous for coffee beverages for which a distinctive crema or foam is desired.

According to the described embodiment, it can be possible to control both the beverage strength (for example the coffee concentration in the coffee liquid extract in the cup) and the amount of foam or crema on the beverage.

It is thus possible to provide for example a 'ristretto' coffee extract with a relatively high concentration of coffee and a high amount of crema by adjusting, respectively, the volume of 25 mL, a relatively low flow rate and a relatively high preload of the flow restriction valve. On the contrary, it is for example also possible to prepare a relatively light 'lungo' coffee extract with a low amount of crema by adjusting the volume to 110 mL, a relatively high flow rate and a relatively low preload of the restriction valve.

In a preferred embodiment, the preload on the flow restriction valve is adjustable by mechanical actuation means driven manually or by a motor controllable by the control unit. Hence, the amount of foam or crema of the beverage to be prepared can be adjusted by the user.

In a possible alternative, the speed of the driving means may be controlled in relation to a detected pressure of liquid in the centrifugal cell respectively in the capsule or of the pressure of liquid reigning in the liquid supplying line before the cell. Thereby, the pressure in the cell or before the cell is preferably measured by a pressure sensor positioned within the cell or upstream of the cell, e.g., in the liquid supplying line between the pump and the water injection point in the cell. It should be noted the present invention can be adapted to a control of the pressure of liquid as an alternative to a control of flow rate or as an additional control means to regulate the rotational speed and, consequently, the strength of the beverage.

In a second aspect, the present invention relates to a system for producing a beverage from portioned ingredients provided within a capsule, the system comprising a beverage producing device having a centrifugal unit comprising at least two enclosing members for enclosing the capsule by a relative movement of the enclosing members,
  driving means connected to the centrifugal unit for enabling a rotational motion of the centrifugal unit,
  a liquid injection assembly designed to interact with the capsule provided to the device and connected to liquid supply means,
  means for measuring the flow rate, or respectively the pressure, of the liquid,
  control means for controlling the flow rate, or respectively the pressure, of liquid to match a flow rate reference, or respectively a pressure reference, in a control loop by automatically adjusting the rotational speed of the driving means during the extraction phase of the beverage production depending on the measured flow rate, or respectively the measured pressure,
  wherein the capsule is designed to be removably inserted into the centrifugal unit of the device.

The capsule to be used with the device according to the present invention is preferably a single-use capsule sealed in a protective atmosphere before use. The capsule can have a rigid dished body and a lid, wherein the lid of the capsule comprises outlet openings arranged at a peripheral portion of the lid. In a possible alternative, the capsule can be capsule permeable to liquid and gas when inserted in the device such as a filter capsule.

The capsule preferably contains ground coffee, soluble coffee, tea, cocoa, milk and combinations thereof.

For coffee, the amount of coffee can differ in the capsule depending on the type of coffee beverage to be delivered. For instance, a lungo-type coffee can be prepared from a higher amount of coffee contained in the capsule compared to a ristretto or an espresso-type coffee. The coffee powder may also be prepared from many different blends and origins.

The capsule to be used in the device can be associated to a code containing information relative to one or more of the following parameters: flow rates, beverage volumes, speeds, beverage temperatures, etc.

The injection of the liquid provided by the device preferably takes place at an upper face of the capsule which may already have an inlet port and the injection of liquid can be done by connecting an injection member such as a tube to an inlet port of the capsule. In a possible alternative, a foil of the capsule which covers the lid can be pierced by a piercing member connected to the injection member of the device. The output of the beverage to be prepared takes place at a peripheral section of the lid of the capsule which is provided with a plurality of outlet openings.

It should be understood that the single-use capsule according to the present invention may contain any of a culinary liquid such as soup or sauce, a beverage liquid such as coffee, chocolate, milk, tea, etc., or a nutritional liquid such as an infant formula.

In a third aspect, the present invention relates to a method for preparing a liquid comestible from a portioned food substance contained in a capsule or cell by passing liquid through the substance using centrifugal forces, comprising the steps of connecting the capsule or cell to a liquid supply, rotating the capsule or cell about its rotational axis to enable an interaction between the liquid and the portioned ingredients provided within the capsule, controlling the flow rate, or respectively the pressure, of liquid to match a flow rate reference, or respectively a pressure reference, by automatically adjusting the rotational speed of the driving means during the extraction phase of the beverage production depending on the measured flow rate, or respectively the measured pressure, of liquid.

In particular, the flow rate is controlled in relation to a selection of strength of the beverage carried out by the user.

Furthermore, the level of crema or foam can also be controlled by adjusting the load on the restriction valve at the exit of the capsule or cell.

In order to avoid unnecessary repetitions, the method can be defined as including all the possible operations as aforementioned described in relation to the operations of the device or system of the invention.

BRIEF DESCRIPTION OF THE DRAWINGS

Further features, advantages and objects of the present invention will become apparent for a skilled person when reading the following detailed description of embodiments of the present invention, when taking in conjunction with the figures of the enclosed drawings.

DETAILED DESCRIPTION OF THE FIGURES

Figure 1:
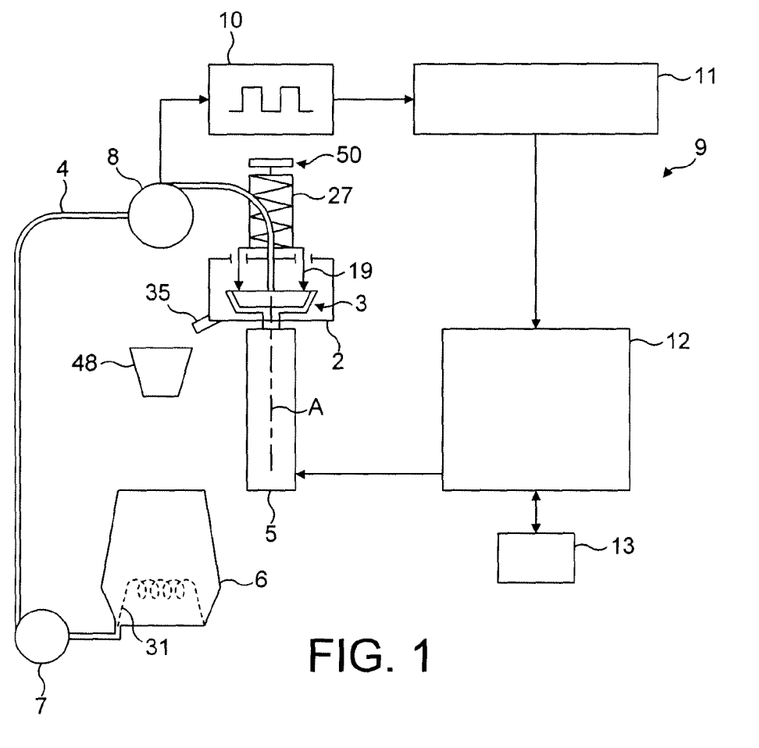
FIG. 1 is a schematic representation of the centrifugal system.

FIG. 1 is a schematic drawing of the centrifugal system according to the present invention.

As can be seen in FIG. 1, the system comprises a centrifugal unit 2 in which a centrifugal cell 3 can be placed. The centrifugal cell 3 may be a single-use capsule which contains portioned food ingredients. Before its insertion in the unit, the capsule is preferably sealed in a gastight manner to maintain freshness of the food ingredients contained therein. Alternatively, the centrifugal cell 3 may be a re-fillable filter cell removably connectable to the centrifugal unit 2.

The centrifugal unit 2 is connected to driving means 5 which is preferably an electric motor. The driving means 5 is designed to rotate a rotary drum of the centrifugal unit 2 along an axis of rotation A and thus, the centrifugal cell 3 housed within the rotary drum of the centrifugal unit 2 about the same axis A of the centrifugal cell 3. It should be noted that the cell could be part of or all the rotary drum, in particular, when the cell is not specifically a single-use capsule but a refillable part of the device.

The centrifugal unit 2 further comprises a collecting part and an outlet duct 35 through which the beverage to be prepared is discharged into a provided receptacle 48 such as a cup or mug, for example.

The system further comprises liquid supply means which comprise a water reservoir 6 and a fluid circuit 4. The reservoir 6 preferably comprises water heating means 31 for heating the water contained within the reservoir 6. The heating means 31 may be a heating coil. The heating of the water may as well be obtained by a thermoblock in the fluid circuit 4 and placed downstream relatively to the water reservoir 6.

The liquid supply means further comprise a pump 7 connected to the reservoir 6. The pump 7 is preferably a centrifugal pump. Moreover, the pump 7 is connected to the centrifugal unit 2 by means of the fluid circuit 4.

The pump 7 is preferably a low pressure pump which serves the purpose of providing sufficient liquid to the centrifugal unit 2 at low pressure. In addition, during operation of the centrifugal unit 2, the centrifugal cell 3 acts as a centrifugal pump by drawing water from the liquid supply.

In the centrifugal unit 2, a flow restriction means 19 is provided to create a restriction of the flow of the centrifuged liquid which leaves the cell 3 before it is collected in the collecting part of the unit. The flow restriction means 19 enables to increase the dwell time of liquid in the cell and therefore improves the extraction, in particular, for coffee or tea, between the liquid and the ingredients contained in the cell. Furthermore, due to the high rotational forces necessary for the flow to pass through restriction means, the velocity of the flow is significantly high. As a result, a nice amount of foam or crema can be obtained. Preferably, the flow restriction means 19 is a valve which opens or at least provides an increase of a flow opening(s) by pressure of the centrifuged liquid in the cell. For this, the valve 19 comprises elastic biasing means 27 for counter-acting the pressure of the centrifuged liquid up to a given load. Furthermore, the valve's load acting in restriction or closing on the flow can be made adjustable by means of a load actuating means 50. For instance, the load actuating means 50 acts on the elastic biasing means 27 to vary positively or negatively the pre-load on the valve 19. Therefore, the higher the elastic means are pre-stressed, e.g., by a compressive constraint of the actuating means 50 on the resilient member, the higher the pressure of liquid is necessary for overcoming the restriction means, i.e., for opening the valve, and maintaining the flow rate, therefore, the higher the rotational speed must be. As a result, the level of foam or crema can be controlled by adjusting the load of the valve means 19.

In the fluid circuit 4 between the liquid supply means and the centrifugal unit 2, metering means 8 for the flow rate of the liquid are situated. The metering means 8 is preferably a pulse-coded flow-metering turbine which generates electrical impulse data 10. Thereby, the period of the generated impulses is preferably proportional to the velocity of the liquid flow within the fluid circuit 4.

The system further comprises control means 9 which comprise a counter 11, a central controller 11 such as a PID (proportional-integral-derivative) controller able to provide control loop feedback mechanism, and a manual user interface 13. The control means 9 are preferably connected to the flow-metering turbine 8 to receive the process variable relative to the flow rate and to the driving means 5 of the rotational motor for input of the manipulated variable to the motor, i.e., the rotational speed. Furthermore, the controller 12 is connected to the pump 7 to start and stop the liquid supply in the circuit.

The counter 11 connected to the flow-metering turbine 8 enables an analysis of the generated impulse data 10. The analysed data is then transferred to the central controller 12. Accordingly, the exact actual flow rate of the liquid within the fluid circuit 4 can be calculated in real-time.

Therefore, the central controller 12 connected to the driving means 5 may adjust the rotational speed of the driving means depending on the measured flow rate of the liquid.

Moreover, the central controller 12 preferably comprises a memory (not shown) in which certain parameters of the extraction profile can be saved such as rotational speeds of the centrifugal cell, initial extraction speed of the cell, calibration of the flow meter, prewetting time, dry spinning time, acceleration and deceleration speed ramps, etc. In particular, the controller 12 may contain the set points and values of the rotational speed of the driving means 5 at different phases of the beverage preparation cycle. These parameters serve as part of different predetermined beverage preparation profiles in relation to control algorithms for processing the different profiles on demand.

In addition, a manual interface 13 is connected to the central controller 12 which enables a user of the device of the invention to choose at least the strength of the beverage and, preferably also, the dispensing volume of the beverage to be prepared. Thus, the central controller controls the flow rate during the extraction phase which corresponds to the selected beverage strength in response to an input of the manual interface by varying the rotational speed of the driving means accordingly. The manual interface can be any mechanical, interactive or multimedia user: machine interfacing means which is associated to the device or remote. Thus, the manual interface can be a keyboard, touch screen, cellular phone, personal computer, laptop, palm, etc.

Figure 2:
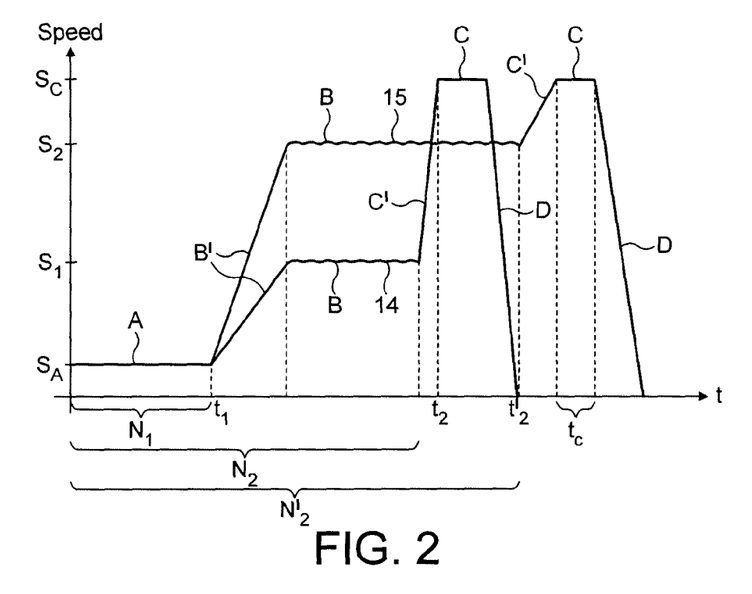
FIG. 2 is a graphical representation of the speed as a function of time during a typical brewing cycle for a concentrated strong coffee beverage and a comparatively lighter coffee beverage.

FIG. 2 is a graph showing examples of variation of the rotational speeds of the driving means as a function of time during typical beverage preparation cycles for a highly concentrated beverage and for a comparatively lighter beverage.

The characteristic curve 14 of FIG. 2 may for example represent an extraction profile for a strong short coffee, such as an 'espresso' or ristretto' type coffee. By contrast, the characteristic curve 15 of FIG. 2 may for example represent an extraction profile for a lighter 'lungo' type coffee.

Next, a beverage preparation cycle according to the present invention will be described with reference to FIG. 1 and the characteristic curves 14 and 15 of FIG. 2.

At the beginning of the beverage preparation cycle, and after the user's selection, the centrifugal pump 7 is switched on by the controller 12 and thus, hot water is pumped from the reservoir 6 to the centrifugal cell 3 through the flow-metering turbine 8.

Simultaneously or shortly after, the motor speed is started at a low speed to ensure a pre-wetting of the dry food ingredients, e.g., roast and ground coffee, provided within the centrifugal cell respectively the capsule 3. Preferably, said pre-wetting phase A lasts for a given time $t_1$ between 3 and 10 seconds. The prewetting time is preferably a time as determined by a count of impulse data generated by the flow sensing means, which is already stored or storable such as by transfer from a code on the capsule or cell in the memory of the controller 12.

During said pre-wetting phase A, the motor speed $S_A$ is preferably as low as 10-200 rpm (round-per-minute) to ensure a homogeneous distribution of water in the ingredients. Normally, the speed is too low to enable the liquid to overcome the restriction valve 19. Therefore, during this phase, the liquid remains in the cell and simply fills the volume non-occupied by the ingredients.

Thereby, the counter 11 analyses the impulse data 10 generated by the flow-metering turbine 8. For example, the counter 11 counts the amount of impulses for a pre-defined period of time. At a predefined count $N_1$, the end of the pre-wetting phase A is reached. Thereby, the count N1 can be adjusted by software loaded in the memory of the control means. Moreover, it may be possible to define the time of the pre-wetting phase A and/or the volume to be provided to the centrifugal cell 3 during the pre-wetting phase by means of the manual interface 13.

The parameters regarding the rotational speed $S_A$, the volume of the provided liquid and the time $t_1$ of the pre-wetting phase A are preferably equal for all different kinds of beverages to be prepared. For example, for different types of coffee beverages such as e.g. 'ristretto', 'espresso' or 'lungo', $N_1$ or $t_1$ may be the same. However, the parameters of the pre-wetting phase A may as well be set different for different kinds of beverages to provide different wetting profiles.

After the pre-wetting phase A, the extraction phase B of the beverage preparation cycle takes place. Hence, when the number $N_1$ of counted impulses is reached, the control means 12 accelerate the driving means 5 in a ramp-up phase B' to the extraction phase B to reach a predetermined speed set-point $S_1$ respectively $S_2$ for the rotational speed of the driving means 5.

It should be understood that the time for the described ramp up B' may differ for different kinds of beverages to be prepared.

The set point $S_1, S_2$ is the initial speed value for the extraction phase which can be determined in relation to the selection made at the manual interface. The set point $S_1, S_2$ preferably differs for different beverages such as different coffee beverages for example. As can be seen in FIG. 2, the set point $S_2$ of the lighter beverage 15 relates to a higher rotational speed of the driving means than the set point $S_1$ of the comparatively strong beverage 14, as the contact time between water and the food ingredients within the centrifugal cell 3 is proportionally shorter at a higher rotational speed (at set point $S_2$).

The increase of the rotational speed from $S_A$ to $S_1$ or $S_2$, provides the liquid a sufficient momentum to traverse the ingredients in the cell and forces the valve means 19 to open under the pressure of the centrifuged liquid. Therefore, the ramp-up phase causes the opening of the valve or enlargement of the valve's opening and, thereby, the centrifuged liquid starts being discharged through the duct 35.

At the beginning of the extraction phase B, the distinctive flow rate at the set point $S_1,S_2$ is calibrated by the impulse data 10 received from the flow meter 8. Accordingly, the flow rate at the beginning of the extraction phase B is linked to a predefined rotational speed of the driving means.

It should be understood that the initial flow rate through the centrifugal cell 3 during the centrifugal beverage preparation process can be affected due to progressive compaction of the food ingredients within the centrifugal cell 3 for example. Accordingly, the pressure drop at the centrifugal cell 3 changes and thus, the flow rate through the centrifugal cell 3 diverges. Therefore, in order to maintain a substantially constant flow rate through the centrifugal cell 3, the rotational speed of the driving means 5 is varied such as being increased or decreased in order to compensate for the changes of the flow rate.

Hence, after the above described calibration of the flow rate at the set point $S_1$, $S_2$, the control means 9 may vary the rotational speed of the driving means 5 continuously or at small intervals to maintain a relatively constant nominal flow rate during the extraction phase B. In order to provide a relatively stable flow rate and avoid too much oscillation, the correction of flow rate can be typically controlled by using a PID control algorithm implemented in the controller wherein the process value (PV) is the measured flow rate, the desired flow rate is the set point (ST) and the manipulated variable (MV) is the speed output from the controller to the rotational motor.

More precisely, the counter 11 particularly measures the periods of the impulses generated by the flow meter 8. Hence, if the measured period is higher than a set reference value, which was calibrated before, an acceleration of the speed is necessary and vice versa. The speed can be varied stepwise or continuously. In a stepwise speed control, the flow rate correction can be made by the control unit varying the speed of + or −200 rpm, for instance.

Accordingly, during the extraction phase B, the rotational speed of the driving means 5 is constantly adjusted by the control means 9 in response to the sensed flow rate data 10.

Accordingly, a substantial constant value of the flow rate which differs only by a certain tolerance of, for instance, +/−10% can be obtained. The rotational speed of the driving means 5 is adjusted preferably at intervals of less than 1 second, for instance, in the order of a few milliseconds.

After a second count $N_2$ of the flow-metering means 8 is reached, the water pump 7 is stopped by the control means 9. Thereby, the count $N_2$ of the flow-metering means 8 determines the total volume of the beverage to be dispensed.

It should be understood that the count $N_2$, $N'_2$ may vary for different kinds of beverages.

Preferred volumes of different types of coffee beverages are for example 25 mL for a 'ristretto', 40 mL for an 'espresso', 110 mL for a 'lungo', and 250 mL for an 'Americano' type coffee beverage.

Accordingly, the indicated reference numeral $N_2$ may refer to a short beverage such as a 'ristretto' or 'espresso' type coffee for example, whereas the reference numeral $N_2$, which relates to a greater number of counted impulses and thus, to a greater liquid volume may refer to a 'lungo' type coffee beverage for example.

After the pump 7 is stopped, a dry-spinning phase C of the beverage preparation cycle takes place in order to empty the cell from residual liquid. The rotational speed of the driving means 5 is preferably higher than during the extraction phase B. Hence, at second count $N_2$, an acceleration ramp up C' takes place until a predefined set point $S_C$ of rotational speed is reached. Then, spin-drying of the ingredients within the centrifugal cell 3 is carried out for a predefined period of time $t_C$. Thereby, said predefined time $t_C$ for the spin-drying phase C can be predetermined in the software of the control means, e.g., 5-10 seconds.

After the spin-drying phase C, the rotational speed of the driving means 5 is decelerated as indicated by the deceleration phase D in FIG. 2. Accordingly, the beverage preparation cycle is finished.

Of course, the spin-drying phase C could be run at the same rotational speed as the extraction phase or at a lower speed.

Before the start of each beverage preparation cycle, the manual interface 13 of the system preferably comprises a pre-selection for enabling a user to choose preferably two parameters:

the volume of beverage (e.g., 25, 40, 110, 250 mL) and,
the coffee concentration (e.g., from light to strong).

The selection is then received by the control means 9 which calculates the corresponding flow rate by measuring the periodicity of the impulses which then serves as a reference for controlling the rotational speed of the driving means 5. Thereby, in order to avoid a too big oscillation of the control loop at the start of the extraction phase B according to the selection made, the system is first set up around the set point value of speed $S_1,S_2$.

In a preferred embodiment, the following data is saved in the memory of the control means 9 and can be adjusted by means of dedicated software:

The motor speed $S_A$ at the pre-wetting phase (i.e., a few rpm),
The calibration of the flow meter in volume unit per impulse (e.g., mL/Impulse),
The number N of impulsions during prewetting,
The acceleration ramp up to the extraction phase B',
The acceleration phase to the spin-drying phase C',
The spin-drying speed $S_C$.
The spin-drying time $t_C$,
The deceleration rate D.

Of course, these functions can be assured by an integrated circuit.

Figure 3:
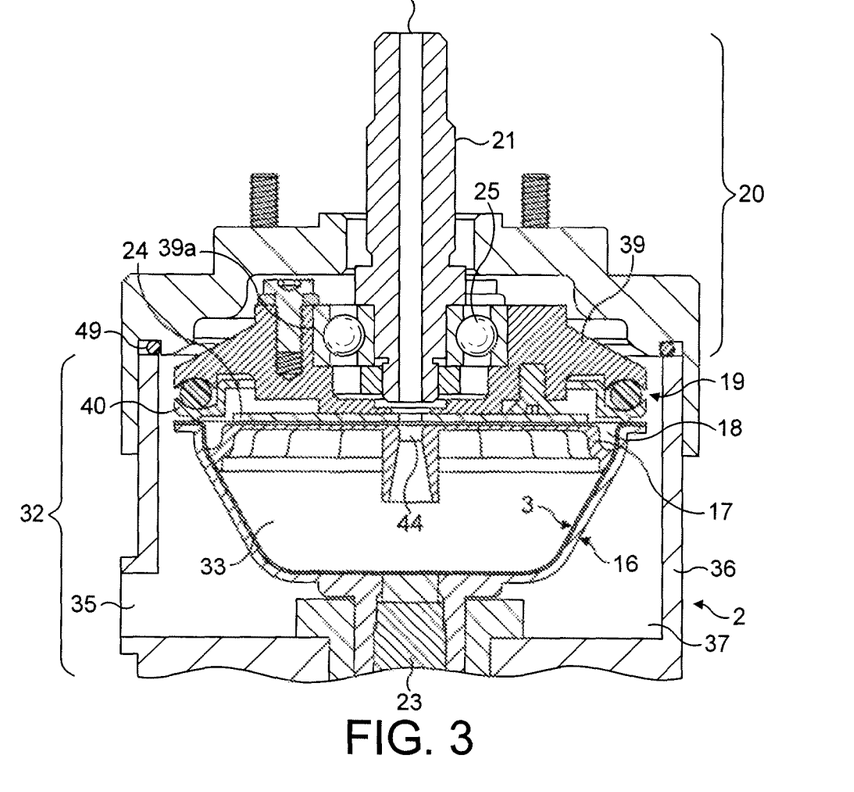
FIG. 3 is a cross sectional view of the centrifugal unit according to a non-limiting example.

FIG. 3 is a cross sectional view of an embodiment of the centrifugal unit 2 according to the present invention.

The centrifugal unit 2 of the device comprises an upper enclosing member 20 and a lower enclosing member 32 which can be moved relative to each other.

The capsule 3 to be used with the device or the system according to the present invention may be any of the capsules described in PCT/EP08/056310 (WO 2008/148646).

The capsule 3 as shown in FIG. 3 is pre-opened before it is inserted in the device, i.e., a sealing foil arranged at an upper face of the capsule is removed by peeling, or a central hole is perforated in the foil of the capsule when the capsule is inserted in the device.

The capsule 3 optionally comprises an inner member forming a lid 17 which is inserted in the dished body of the capsule. The lid 17 and body 42 delimit together an internal enclosure 33 for receiving a portioned food substance. The lid 17 comprises outlet openings 34 (see FIG. 4) at a peripheral section 47 of the lid 17 for filtering the beverage and maintaining the food (coffee) particles within the capsule 3 during the beverage preparation. Accordingly, only the liquid comestible to be prepared is discharged through the outlet openings 34.

The lower enclosing member 32 of the centrifugal unit 2 is a receiving assembly which comprises a liquid duct 35, for example, protruding on a side of the assembly 32 for guiding the centrifuged liquid coming out of the capsule 3 to a receptacle 48 such as a cup or glass (see FIG. 1).

The liquid outlet 35 is in communication with a liquid receiver 36 forming a cylindrical wall placed at a short distance about a rotating drum 16 into which the capsule is inserted as illustrated in FIG. 3. Thereby, the rotary drum 16 is preferably a hollow capsule holder with an internal cavity complementary shaped to receive the capsule. The liquid receiver 36 defines with the drum 16 an intermediate cavity 37 for collecting the liquid.

Below the liquid receiving assembly 32, are placed means for driving the capsule receiving drum 16 in rotation inside the receiving assembly 32. The driving means 5 comprise preferably a rotary motor which can be supplied by electricity or gas power. The drum 16 and the driving means 5 are connected by a motor axle 23 which preferably protrudes through an aperture in the bottom of the liquid receiver 36.

The upper enclosing member of the centrifugal unit 2 is a liquid injection assembly 20 which comprises a water line 22 which is in fluid connection with the pump 7 and the flow meter 8 (see FIG. 1). Moreover, the water line 22 is connected to a water injector 21 which is arranged co-centrically to the rotational axis A of the capsule 3 within the centrifugal unit 2.

In the shown embodiment, the water injector 21 is designed as a simple water inlet of the capsule. However, the water injector 21 may as well be equipped with puncturing means which are designed to puncture or tear a membrane or foil provided at an upper face of the capsule 3.

About the water injector 21 is mounted a capsule rotary engaging part 39. The engaging part 39 has a central bore 39a for receiving the water injector 21 and rotational guiding means such as a ball or needle bearing 25 inserted between the engaging part 39 and the injector 21.

In order to enable sealing of the water inlet of the capsule, a sealing member 24 is arranged around the water injector 21 at a lower face of the rotary engaging part 39. The sealing member 24 is thus arranged between the rotary engaging part 39 and an upper face of the capsule 3. Thereby, the sealing member 24 applies a certain sealing pressure on the upper lid 17 of the capsule. Hence, water is effectively prevented from leaking along the upper surface of the capsule 3 and from by-passing the capsule to release directly through liquid outlet 35 of the centrifugal unit 2. Furthermore, a venting means (not shown) can be provided through the injection assembly 20 for enabling gas to escape from the capsule as liquid is filled in the capsule.

The liquid receiving assembly 32 and the liquid injection assembly 20 are preferably arranged to encase the capsule or centrifugal cell 3, the receiving drum 16 and the water injector 21. Preferably, the receiving assembly 32 and the injection assembly 20 can be moved relatively to each other such that a user of the device may access the rotary drum 16 in order to exchange the capsule 3 for example. Therefore, a closing mechanism (not shown) may be connected to the receiving and the injection assembly 32,20 in order to enable a relative movement of the receiving and the injection assembly 32,20.

In order to enable a sealing of the receiving assembly 32 and the injection assembly 20 during the operation of the device, sealing means such as an O-ring 49 for example are provided at the contact surfaces of the assemblies.

The water injection assembly 20 further comprises a valve system 19 for controlling the flow of liquid that is discharged from the capsule 3 during operation of the device. The valve system 19 can be arranged on the capsule rotary engaging part 39 in the form of an annular engaging portion 40 which is biased under the force of elastic loading means 27.

Figure 4:
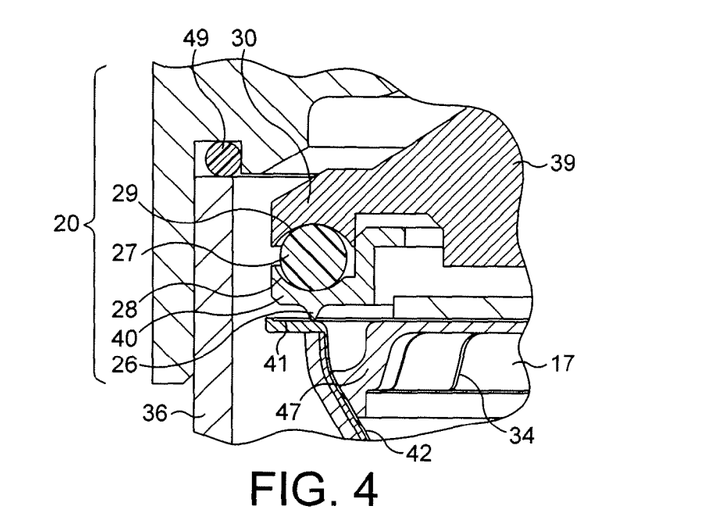
FIG. 4 is an enlarged view of a detail of FIG. 3.

As can be seen in FIG. 4, the annular engaging portion 40 includes a pressing peripheral pinching edge 26 which applies a closing force on the peripheral rim 41 of the capsule 3 to be able to restrict the flow of liquid under the force of the elastic loading means 27.

As can be seen in FIG. 4, the elastic loading means 27 can be a rubber-elastic ring member which is supported by an upper and a lower annular seat portion 28, 29. Other means such as spring-biased loading means 27 may as well be applied to the device.

It should be understood that the load of the elastic loading means 27 is preferably adjustable. Hence, the pressure of the liquid which has to be exerted on the flow restriction valve 19 in order to enable a discharging of liquid from the capsule 3 to the outlet 35 of the device can be adjusted.

As can be seen in the figure, the pinching edge 26 is preferably 'V'-shaped or cone-shaped. Thus, the sealing pressure in a localized area is increased. The valve means 19 further comprises an internal base member 30 which is preferably an integral part with the rotary engaging part 39 of the injection assembly 20. The elastic loading means 27 thus are inserted in a space located between the base portion 30 the engaging portion 40.

Therefore, at a rest position, the engaging portion 40 of the valve 19 keeps closing on the rim 41 of the capsule 3 under the compressive effect of the resilient means 27

The operation of the device is described in the following.

The capsule device is opened by moving the two assemblies 20, 32 relatively one another, e.g., by means of a dedicated closing mechanism and separating the two assemblies 20, 32. As a result, a single-use capsule 3 containing a food substance can be inserted in the device, i.e., placed in the cavity of the rotating drum 16. The device is then closed by the assembly 20 being connected back onto the assembly 32 and locked by the closing mechanism. In the locked position, the water injector 21 is connected to a water inlet 44 of the capsule. Water can thus be introduced in the capsule via the central water injector 21. The capsule can be driven in rotation by activating the driving means 5. The centrifugation is carried out by rotating the capsule around the central axis of rotation of the device that is preferably aligned to the central axis Z of the capsule. During the prewetting phase as described, previously, the capsule is filled with water and the ingredients are entirely wetted. The control means control the speed as such a low speed that liquid pressure is insufficient to open the valve 19.

After a sufficient acceleration of the rotational speed is carried out and the extraction phase 'per se' begins, the centrifuged liquid is allowed to pass through the plurality of outlet openings 34 provided in a peripheral portion 47 of the lid 17 of the capsule. Under the effect of high centrifugal forces, the food substance, such as e.g. ground coffee powder, tends to compact itself radially whereas water is forced to flow through the substance. This results in the substance being both compacted and intimately wetted by water. Due to the high rotational movement of the capsule, the centrifugal forces exert themselves uniformly on the mass of the substance. Consequently, the water distribution is also more uniform compared to usual methods using a pressure pump to exert the pressure in the capsule. As a result, there is lower risk of preferential flow path through the substance which could lead to areas which are not properly wetted and so not properly brewed, dispersed or dissolved. As result of the high centrifugal forces during the extraction phase, the valve is forced to open and liquid is so projected as a laminar flow at relatively high velocity in direction of the wall 36.

Figure 5:
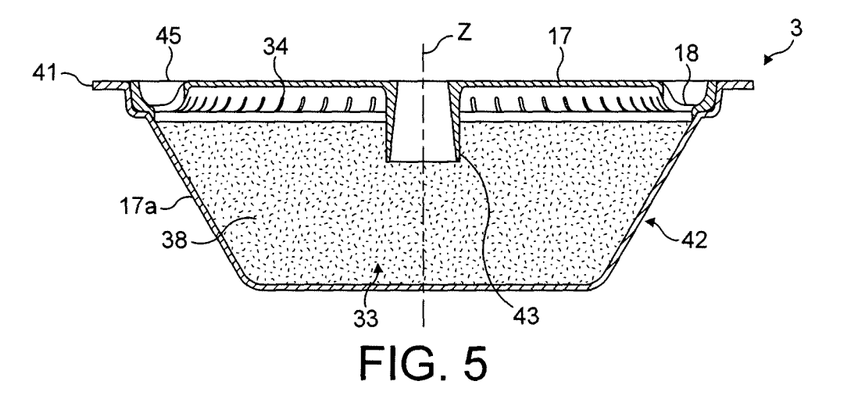
FIG. 5 is a sectional side view of a capsule according to the present invention.
Figure 6:
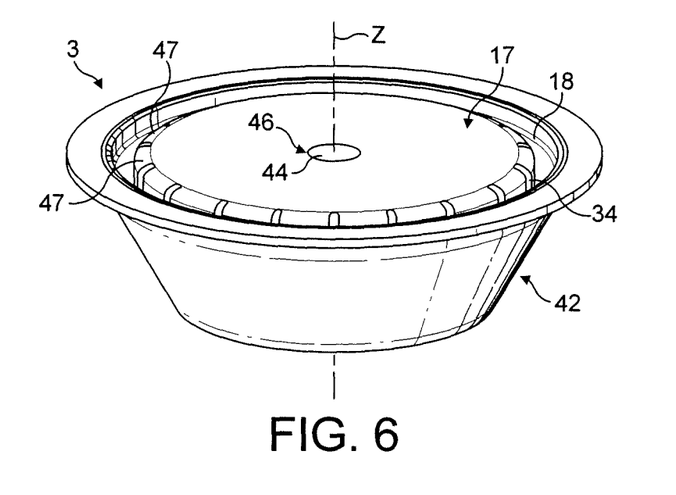
FIG. 6 is a perspective side view of a capsule according to FIG. 5 with its top membrane being removed.

FIGS. 5 and 6 relate to a capsule which is preferably used with the device and system according to the present invention. However, it should be understood that the shown embodiment is just an exemplary embodiment and that the capsule according to the invention can take various different embodiments.

The capsule 3 comprises a rigid dished body 42 which comprises an annular rim portion 41. The capsule is preferably design as being rotationally symmetric about central axis Z. Thereby, it should be noted that the capsule may not necessarily have a circular section around axis Z but may take another form such as a square, rectangle or a polygonal form. Thereby, axis Z is preferably aligned to the axis of rotation A when the capsule is inserted in the device.

Moreover, the capsule 3 comprises a lid 17 which preferably has the form of a disc of plastic comprising a central portion 46 and a peripheral portion 47. The central portion 46 can be substantially flat and may comprise an inlet port 44 for enabling the fitting or introduction of a water injection member 21 of the beverage production device.

It should be noticed that the lid 17 can be a rigid or semi-rigid member made of thermoformed or injected plastic for instance. However, this part could also be made of a flexible membrane which is sealed to the inner surface of the dished body without departing from the scope of the invention.

At the side of the lid 17 which faces the inside of the capsule 3, the inlet port 44 can extend by a tubular inlet portion 43 which serves for ensuring the water is guided toward the direction of the bottom of the body to ensure complete wetting of the substance 38 in the enclosure and so reduced risk of leaving for example "dry powder spots".

The upper surface of the capsule 3 may be equipped with a foil 45 which enables sealing of the capsule 3. The foil preferably covers the lid 17 and is welded or adhesively connected onto the peripheral edge 41 of the body of the capsule. The foil can be permanently connected to the edge if the foil is intended to be pierced for forming the inlet and outlets or, alternatively, the connection is peelable. Before the capsule is inserted into the rotary drum 16 of the device, said foil 45 needs to be pierced or removed in order to enable a preparation of the beverage.

The lid 17 further comprises a peripheral portion 47 including a collecting recess 18. The collecting recess forms a U-shape in transversal section (FIG. 6) which opens in the direction of the sealing foil 45. The recess is preferably continuously extending at the periphery of the lid 17 although it can be replaced by several discontinuous recessed portions which may be separated by reinforcing elements or walls, for example.

The collecting recess 18 comprises an inner peripheral portion of wall 47 of the lid 17 into which is provided a series of outlet openings 34 forming a fluid communication between the enclosure 33 and the collecting recess 18.

Furthermore, the outlet openings 34 may be formed by a filter paper, a woven or non-woven portion or another meshed or porous membrane (not shown). Thus, the lid 17 which is inserted in the dished body 42 comprises a circumferential band of a porous material. The porous material provides restriction of the flow, creating a certain pressure drop, e.g., between 0.5 and 4 bar, and leading to a filtering of the solid particles. In particular, the size of the pores of the material can be chosen to retain also the coffee fines, i.e., the particles of particle size as low as 90 microns. The paper, fabric, meshed or porous material can be formed of a band or bands which can be welded or otherwise combined to the lid.

During operation of the device, the capsule 3 is rotated about its axis Z. Thereby, the liquid which is centrically injected into the capsule 3 will tend to be guided along the inner surface of the side wall of the body, up to the inner side of the lid, and then through the outlet openings 34. Due to the centrifugation of the liquid provided centrically to the capsule 3, the liquid and the ingredients 38 provided within the capsule are made to interact in order to form a liquid comestible.

Figure 7:
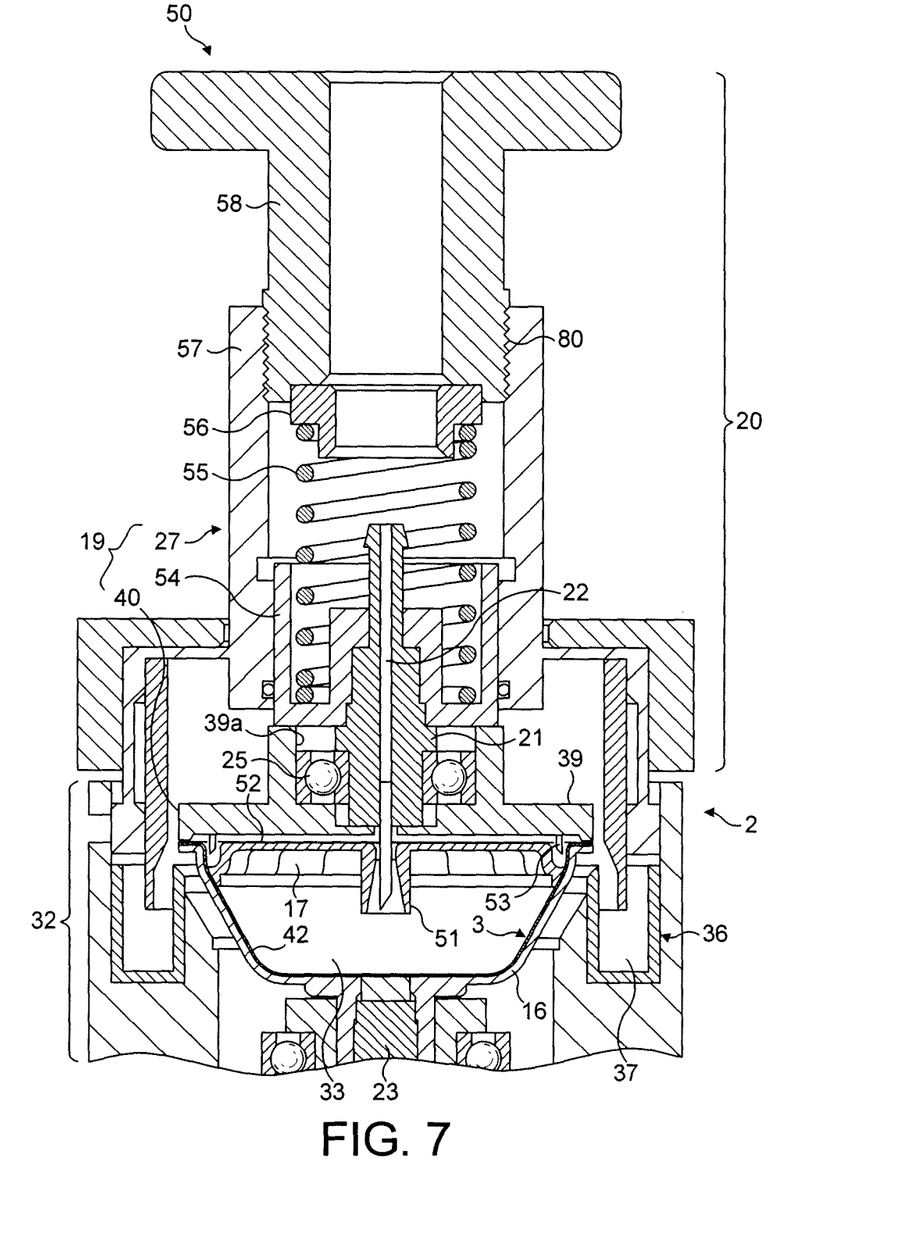
FIG. 7 is a sectional side view of a centrifugal unit according to a variant of the invention.
Figure 8:
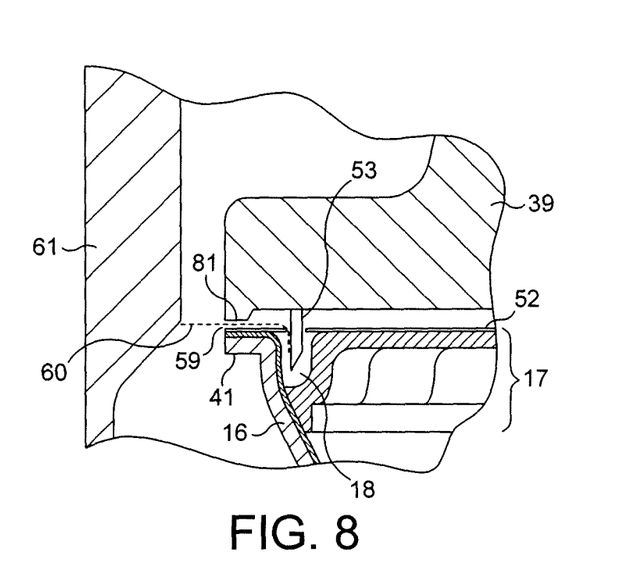
FIG. 8 is an enlarged view of a detail of FIG. 7 when centrifuged liquid is delivered.

FIGS. 7 and 8 provide a variant of the beverage preparation system of the invention in which the load of the valve means is adjustable for enabling a control of the opening pressure in order to control the foam or crema level. For simplifying the present description and avoid repetitions, the same numerical references have been used to refer to similar technical means as in the previous embodiments. The novel aspects of the present embodiment essentially lie in piercing means of the device for piercing inlet/outlets in the capsule and in a different configuration of the flow restriction valve 19 compared to the other embodiments.

As illustrated, the water injector 21 extends coaxially in the capsule 3 by a hollow piercing member 51. The piercing member extends below the upper surface of the capsule 3, in the cavity 33. The piercing member is formed as a hollow tube to supply liquid in the capsule at its tip. The piercing member can so be used to pierce a sealing membrane 52 of the capsule which closes the lid in a gastight manner before the capsule is inserted in the device.

The capsule rotary engaging member 39 can further comprise outlet piercing members 53 placed in axial alignment with the liquid collector of the capsule when the member 39 is engaged in closure on the capsule. The outlet piercing members 53 serve to pierce the membrane 52 of the capsule to define a plurality of outlets at the periphery of the capsule from which liquid collected in the collector can leave the capsule. The outlet piercing members are introduced in the collecting recess 18 of the capsule which is sized in such a way that the peripheral portion 47 of the lid cannot be perforated. The centrifuged liquid can thus be discharged from the collecting recess 18 via the holes which are formed in the sealing foil 52 by the piercing members.

The device further comprises a flow restriction means forming a valve assembly 19 which operates in opening when the pressure of centrifuged liquid has reached a certain threshold. For this, the rotary engaging member 39 has a protruding peripheral edge 40 which engages on the peripheral edge 41 of the capsule. The engagement is forced by an elastic biasing mechanism 27 which provides elastic compressive forces onto the rotary engagement member 39. In this particular embodiment, the elastic biasing mechanism 27 comprises a base 54 at one end into which is fitted a compression spring 55 and an abutting member 56 at the opposite end. The base 54, spring 55 and abutting member 56 are housed into a tubular frame 57. The abutting member 56 is further connected to a screw element 58 which protrudes externally from the frame. The screw element and tubular frame 57 form together an actuating means 50. They comprise a complementary thread 80 assembly enabling to tune the compressive load of the elastic member on the engagement member 39.

As illustrated in FIG. 8, the engagement member 39 which normally applies a closing force onto the edge 41 of the capsule by pressing edge 81, is pushed upwards by the pressure exerted by the centrifuged liquid during the extraction phase, as soon as the rotational speed has reached a sufficient value. The annular gap 59 which is formed between the protruding peripheral edge 41 of the capsule and the pressing edge 81 of the valve determines the laminar flow of liquid. A very thin gap of about 0.1 to 1 mm is maintained opened by the pressure of the centrifuged liquid, thus enabling the liquid to be released at a high velocity in the direction of the impact wall 61 of the receiver. Therefore, as the flow rate of liquid increases during the ramp up phase B', the flow gap 59 increases proportionally. When the flow rate is stabilized during extraction phase B as controlled by the controller, a relatively consistent jet of liquid 60 is projected onto the impact wall 61 of the receiver. This results in a reproducible level of crema, extraction after extraction. When the load of the elastic member is increased by forcing the spring in compression, this results in an increase of the speed by the controller to maintain the flow rate at the set point. For coffee, it is noticed that a higher amount of coffee crema can be obtained accordingly. If a lower amount of crema is desired, the user can reduce the compression on the elastic member by the actuating means, which results in an automatic reduction of the speed for maintaining the same flow rate. Therefore, it is possible to control simply the level of foam of the beverage by adjusting the load on the flow restriction valve. Of course, the screw element can be actuated manually by the user or by use of a motor. If a motor is utilized, it is also possible to automatically control the actuation by the controller which can send input command to the motor. In such case, it is also offered the possibility to use the valve compressive load as a manipulated variable to control the speed and/or flow rate in a control loop scheme.

It should also be noted that the valve 19 can leave one or more minimal outlets in its closed state and that the opening of the valve by the pressure of liquid causes the enlargement of the one or more outlets. For example, a few radial channels forming minimal outlets can be provided in the edge 81 pressing on the surface of the capsule. Channels forming outlets may also be provided within the surface of the edge 41 of the capsule or both in the edges 81 or 41.

It should also be noted that the flow restriction valve could also be made downstream of the capsule without necessarily engaging a part of the capsule but it could be entirely designed in the device itself.

Figure 9:
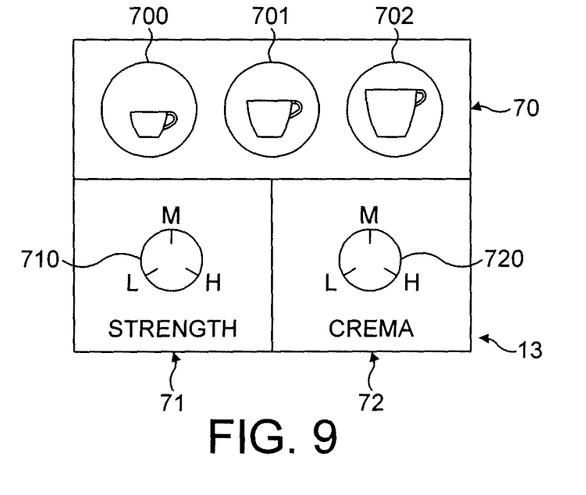
FIG. 9 shows an example of a user's interface of the device of the invention.

As illustrated in FIG. 9, a user's manual interface 13 can provide a choice of beverages, such as coffee, regarding a volume selection area 70, a strength selection area 71 and, optionally, a selection area 72 for a "crema" or foam level. The volume selection area 70 can present a plurality of discrete selecting keys 700, 701, 702 such pressure-sensitive switches, each one prompting for a user to select a predetermined volume of the beverage. For instance, key 700 represents the shortest cup, e.g., for a ristretto coffee volume of about 25 mL; key 701 represents a short espresso coffee cup of about 40 mL and key 702 represents a lungo coffee cup of about 110 mL. The strength selection area 71 can so be actuated independently to set the desired concentration for each desired volume, e.g., amongst low, medium or high strength levels. The actuation of this strength selection key 710, e.g., a potentiometer, will fix the flow rate set point in the controller, as aforementioned, which finally determine the interaction time of the liquid with the ingredients in the capsule. The crema or foam selection area 72 may also comprise a selection key 720, e.g., a potentiometer, for adjusting the level of crema desired. The different levels, e.g., low, medium, high, will be obtained by varying, e.g., continuously or stepwise, the load constraint applied on the restriction valve and, consequently, will have a direct influence on the rotational speed necessary to open the restriction valve during beverage extraction for regulating the flow rate at the set point as fixed by the strength selection. It should be noted that the selection key 720 for crema can be the mechanical actuation means 50 of FIG. 7 if the adjustment system is not automated. Of course the user interface may include a touch screen or an array of membranes or mechanical buttons for receiving input from the user. Additionally, the user interface 112 may include a graphical or character display, such as in the form of a color, monochrome, or LCD display. The user interface may also include a voice prompt interface, wherein the local food waste monitoring device includes a speaker and provides audio instructions, data, and prompts to a user. The user may then press buttons to provide input in response. Alternatively, the user may speak instructions in response to the prompts, and the instructions may be collected via a microphone and interpreted to commands through voice recognition software installed on the controller or interface.

Although the present invention has been described with reference to preferred embodiments thereof, many modifications and alternations may be made by a person having ordinary skill in the art without departing from the scope of this invention which is defined by the appended claims.

What is claimed is:

1. A beverage production device for preparing a liquid comestible from a portioned food substance contained in a capsule or cell, comprising:
   a centrifugal unit for receiving the capsule or cell,
   driving means connected to the centrifugal unit for providing a rotational motion of the capsule or cell in the centrifugal unit,
   liquid supply means being connected to the centrifugal unit to supply liquid in the capsule or cell,
   means for measuring (1) the flow rate of the liquid that is to be supplied to the capsule or cell, or (2) the pressure of the liquid in the capsule or cell, and
   a control unit operatively associated with the measuring means for controlling one of the flow rate or pressure to match a flow rate reference or a pressure reference, respectively, in a control loop by automatically adjusting the rotational speed of the driving means during an extraction phase of the beverage production depending on the measured flow rate or the measured pressure.

2. The beverage production device according to claim 1, wherein the control unit controls the flow rate and the reference flow rate is a constant set point or a variable profile of flow rates stored in or calculated by the control unit.

3. The beverage production device according to claim 2, wherein the control unit is arranged for selecting or calculating different flow rate set points corresponding to respectively different beverage strengths.

4. The beverage production device according to claim 3, which further comprises a manual interface configured to enable at least a selection of the strength of the beverage during the beverage production process and the volume of the beverage to be prepared.

5. The beverage production device according to claim 3, which further comprises identification means for receiving information from a capsule code as to the strength or volume of the beverage to be prepared.

6. The beverage production device according to claim 1, wherein the liquid supply means comprises a pump which is designed for supplying fluid to the centrifugal unit and which is operated by the control means.

7. The beverage production device according to claim 1, wherein the centrifugal unit is designed to act as a centrifugal pump by drawing water from the liquid supply means.

8. The beverage production device according claim 2, wherein the control means is designed to detect electrical impulses of the flow meter in order to calculate the flow rate and the dispensing volume during the beverage production.

9. The beverage production device according to claim 8, wherein the means for measuring the flow rate is a pulse-coded flow metering turbine.

10. The beverage production device according to claim 1, wherein the control unit is arranged to control an extraction profile comprising at least a pre-wetting phase and an extraction phase which differ in at least the associated rotational speeds of the driving means.

11. The beverage production device according to claim 2, which further comprises flow restriction means at a delivery side of the centrifugal unit.

12. The beverage production device according to claim 11, wherein the flow restriction means comprises a valve.

13. The beverage production device according to claim 12, wherein the valve is adjustable.

14. A system for producing a beverage from portioned ingredients provided within a capsule, the system comprising:
- a beverage producing device having a centrifugal unit comprising at least two enclosing members for enclosing the capsule by a relative movement of the enclosing members,
- driving means connected to the centrifugal unit for enabling a rotational motion of the centrifugal unit,
- a liquid injection assembly designed to interact with the capsule provided to the device and connected to liquid supply means,
- means for measuring one of (1) the flow rate of the liquid that is to be supplied to the capsule or cell, or (2) the pressure of the liquid in the capsule or cell, and
- control means operatively associated with the measuring means for controlling the flow rate or pressure to match a flow rate reference or the pressure reference in a control loop by automatically adjusting the rotational speed of the driving means during an extraction phase of the beverage production depending on the measured flow rate or measured pressure, wherein the capsule is designed to be removably inserted into the centrifugal unit of the device.

15. The system according to claim 14, wherein the capsule is a single-use capsule sealed in a protective atmosphere before use.

16. The system according to claim 14, wherein the capsule contains ground coffee, soluble coffee, tea, cocoa or milk.

17. A method for preparing a liquid comestible from a portioned food substance contained in a capsule or cell by passing liquid through the substance using centrifugal forces, which comprises:
- connecting the capsule or cell to a liquid supply,
- rotating the capsule or cell about its rotational axis to enable an interaction between the liquid and the portioned ingredients provided within the capsule,
- controlling one of (1) the flow rate of the liquid that is to be supplied to the capsule or cell, or (2) the pressure of supplied liquid in the capsule or cell to match a flow rate reference or a pressure reference in a control loop by automatically adjusting the rotational speed of the capsule or cell during the extraction phase of the beverage production based upon the measured flow rate or measured pressure.

18. The method according to claim 17, wherein the flow rate is controlled and the controlling is carried out in relation to a selection of the strength of the beverage.

19. The method according to claim 17, wherein the level of crema or foam of the beverage can be controlled by adjusting the load on a flow restriction valve at the exit of the capsule or cell.

* * * * *